United States Patent
Fukuda et al.

[11] Patent Number: 5,847,899
[45] Date of Patent: Dec. 8, 1998

[54] MAGNETIC DISK RECORDING AND REPRODUCING APPARATUS

[75] Inventors: Kazumasa Fukuda; Masanori Sakai; Mikio Matsuzaki; Joichiro Ezaki, all of Tokyo, Japan

[73] Assignee: TDK Corporation, Tokyo, Japan

[21] Appl. No.: 779,339

[22] Filed: Jan. 6, 1997

Related U.S. Application Data

[63] Continuation of Ser. No. 498,527, Jul. 5, 1995, abandoned, which is a continuation of Ser. No. 283,659, Aug. 1, 1994, abandoned, which is a continuation of Ser. No. 85,049, Jul. 2, 1993, abandoned.

[30] Foreign Application Priority Data

| | | | |
|---|---|---|---|
| Jul. 7, 1992 | [JP] | Japan | 4-203050 |
| May 20, 1993 | [JP] | Japan | 5-141498 |

[51] Int. Cl.⁶ ............................ G11B 5/39; G11B 5/02
[52] U.S. Cl. ............................ 360/97.01; 360/113
[58] Field of Search .................... 360/97.01, 97.02, 360/97.03, 102, 103, 110, 113, 135; 428/64

[56] References Cited

U.S. PATENT DOCUMENTS

| | | |
|---|---|---|
| 3,908,194 | 9/1975 | Romankiw . |
| 4,504,880 | 3/1985 | Church et al. .......................... 360/113 |
| 4,647,494 | 3/1987 | Meyerson et al. . |
| 4,918,556 | 4/1990 | Ezaki et al. ........................ 360/97.02 |
| 5,072,320 | 12/1991 | Ezaki et al. ........................ 360/97.01 |
| 5,080,948 | 1/1992 | Morita et al. .............................. 428/64 |
| 5,094,896 | 3/1992 | Morita et al. . |
| 5,094,897 | 3/1992 | Morita et al. . |
| 5,142,425 | 8/1992 | Gailbreath, Jr. et al. ............... 360/123 |
| 5,159,508 | 10/1992 | Grill et al. . |
| 5,227,212 | 7/1993 | Ahlert et al. ........................ 360/97.01 |
| 5,270,882 | 12/1993 | Jove et al. .............................. 360/67 |
| 5,375,022 | 12/1994 | Gill et al. .............................. 360/113 |
| 5,424,890 | 6/1995 | Suyama et al. ........................ 360/113 |

FOREIGN PATENT DOCUMENTS

| | | | |
|---|---|---|---|
| 63-237206 | 10/1988 | Japan | 360/103 |

*Primary Examiner*—William J. Klimowicz
*Attorney, Agent, or Firm*—Oblon, Spivak, McClelland, Maier & Neustadt, P.C.

[57] ABSTRACT

A thin film magnetic head includes a slider and thin film magnetic transducers, the slider supporting the thin film magnetic transducers. At least one of these thin film magnetic transducers is a magnetoresistive read element. The surface resistivity $\rho$ of the magnetic film of the magnetic disk is within the range of $\rho \geq 0.03\,\Omega\cdot\text{cm}$. Electric leak from the thin film magnetic head to the magnetic disk and electric discharge between these two are prevented.

28 Claims, 4 Drawing Sheets

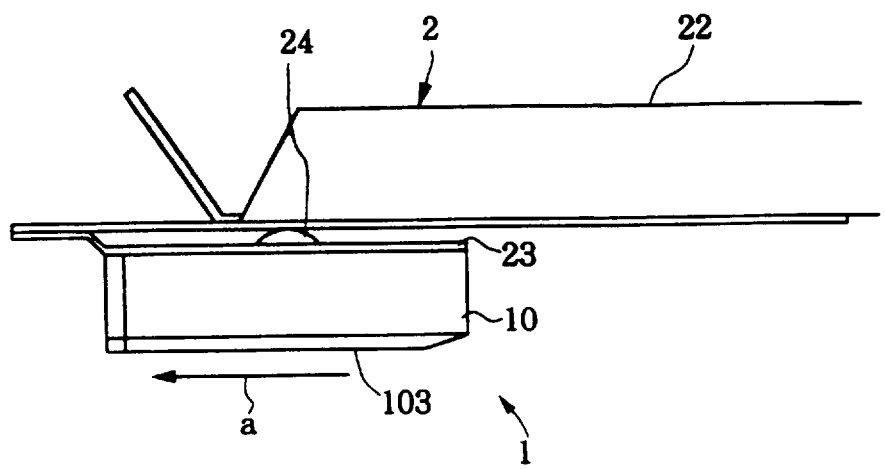
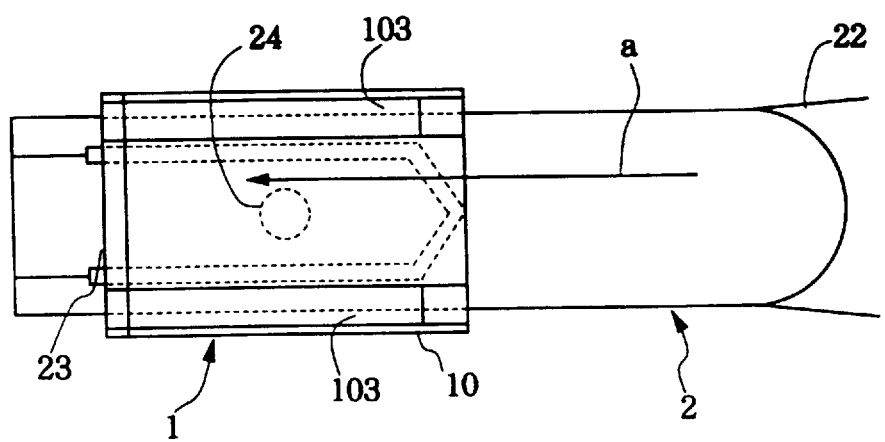

MAGNETIC DISK RECORDING AND REPRODUCING APPARATUS

This application is a Continuation of application Ser. No. 08/498,527, filed on Jul. 5,1995, now abandoned, which is a Continuation of Ser. No. 08/283,659 filed on Aug. 1, 1994, now abandoned, which is a Continuation of Ser. No. 08/085, 049 filed on Jul. 2, 1993, now abandoned.

BACKGROUND OF THE INVENTION

1. Field of the Invention

The present invention relates to a magnetic disk recording and reproducing apparatus wherein a thin film magnetic head employing a magnetoresistive element as the read element, and a magnetic disk are used in combination.

2. Discussion of Background

Previously, the best known flying-type thin film magnetic head was the type in which an inductive type thin film magnetic transducer was used for the read/write elements. In order to achieve high read output with a thin film magnetic head that employs an inductive type thin film magnetic transducer, it is necessary either to increase the relative speed between the magnetic disk and magnetic head or to increase the number of turns in the winding. However, the general tendency is toward more compact magnetic disks, and raising the relative speed is at odds with that requirement. Also, increasing the number of turns in the winding results in an increase in inductance in the coil and an increase in the resistance value of the DC. This, in turn, leads to degradation of the high-frequency characteristics, which is an impediment to high-speed readings.

As a means to address such problems, a magnetic disk recording and reproducing apparatus is proposed wherein the read element is a magnetoresistive element and an inductive type thin film magnetic transducer is used only for the write element. Literature on prior art includes Japanese Examined Patent Publication No.1984-35088. In this embodiment, the magnetoresistive read element is supplied with a constant DC during read operations (hereafter referred to as the sense current). Then, changes in the magnetic field of the magnetic disk are detected as changes in the electrical resistance value.

However, in a magnetic disk recording and reproducing apparatus which employs the combination of a thin film magnetic head having a magnetoresistive element for the read element, and a magnetic disk, the sense current runs constantly through the magnetoresistive element. At the same time, the magnetic disk has a magnetic recording layer on an electrically conductive rigid substrate and this disk is mechanically linked with a drive unit located at ground electrical potential. As a result, if the thin film magnetic head comes in contact with the surface of the magnetic disk during a read operation, the sense current will leak from the thin film magnetic head through the magnetic disk to the ground side or a spark discharge will be generated between the thin film magnetic head and the magnetic disk. These two events both cause a head crash of a kind which is impossible to recover from. Especially in recent years, in order to support high-density recording, the flying height of thin film magnetic heads has become very low; for example, 0.1 $\mu$m or lower. Because of this, even minimal projections on the surface of the magnetic disk can cause electrical contact between the magnetic head and the magnetic disk.

Even when no electrical contact occurs in this manner, a discharge may take place between the read element and the magnetic disk at short intervals, resulting in a similar head crash. If we hypothesize, for example, a capacitor between the read element and the magnetic disk based upon the flying height of the thin film magnetic head, and then consider the charging circuit of the sense current for this capacitor, the factors that will determine the constant charging value will be the resistance of the power supply and the capacitor. As the resistance is normally set at a low value, the charging constant is also low. This means that the capacitor will be charged to its discharge potential very quickly. In addition, as mentioned earlier, since the flying height of the thin film magnetic head has been lowered to, for example, 0.1 $\mu$m or lower in order to accommodate high-density recording, discharge may occur even at a low discharge voltage. This leads directly to an increase in the frequency of discharges in a given period of time and the tendency to more frequent head crashes.

Another known technology is that wherein the electric leak and discharge are prevented by applying an electrically insulating layer on the surface of the magnetic recording layer of the magnetic disk or on the air-bearing surface of the thin film magnetic head. However, in this case, the loss of gap between the magnetic disk and the magnetic transducer will be significant, due to the thickness of the insulating layer. This means that this technology cannot adequately support high-density recording either.

SUMMARY OF THE INVENTION

The object of the present invention is to provide a magnetic disk recording and reproducing apparatus wherein a thin film magnetic head, in which a magnetoresistive element is used for the read element, and a magnetic disk are combined and wherein electric leak from the thin film magnetic head to the disk and discharge between the disk and the head are effectively prevented.

In order to achieve this object, the present invention is a magnetic disk recording and reproducing apparatus that includes a thin film magnetic head and a magnetic disk wherein said thin film magnetic head includes a slider and thin film magnetic transducers in the following manner: the slider supports the thin film magnetic transducers. Further, at least one of said thin film magnetic transducers is a read element by means of magnetoresistive effect. The surface resistivity of the magnetic film of the magnetic disk is expressed as $$\rho \geq 0.03 \Omega \cdot cm.$$

Since at least one of the thin film magnetic transducers is a read element comprising a magnetoresistive element, it is possible to achieve high read output without increasing the relative speed between the magnetic disk and the magnetic head. This makes it possible to realize a magnetic disk recording and reproducing apparatus with superior high frequency characteristics which is suitable for high-speed read operations.

The magnetic film should be set so that the surface resistivity $\rho$ can be expressed as $\rho \geq 0.03 \Omega \cdot cm$. It has been learned that when the surface resistivity $\rho$ is set as described above, no electric leak or discharge occurs between the magnetoresistive read element and the magnetic film of the magnetic disk.

Furthermore, as electric leak and discharge are prevented by setting the surface resistivity $\rho$ of the magnetic film, the present invention is unlike the prior technology, in which an electrically insulating film was applied on the magnetic film or the air-bearing surface of the thin film magnetic head, in that it does not exacerbate the problem of the loss of gap.

The present invention is especially effective for a thin film magnetic head in which a magnetoresistive element or the conducting film for power supply is present on the slider surface that faces the medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 shows an enlarged front view of the magnetic head apparatus used in the magnetic disk recording and reproducing apparatus of the present invention;

FIG. 5 shows an enlarged bottom view of the magnetic head apparatus used in the magnetic disk recording and reproducing apparatus of the present invention and;

DETAILED DESCRIPTION OF THE PREFERRED EMBODIMENTS

Figure 1:
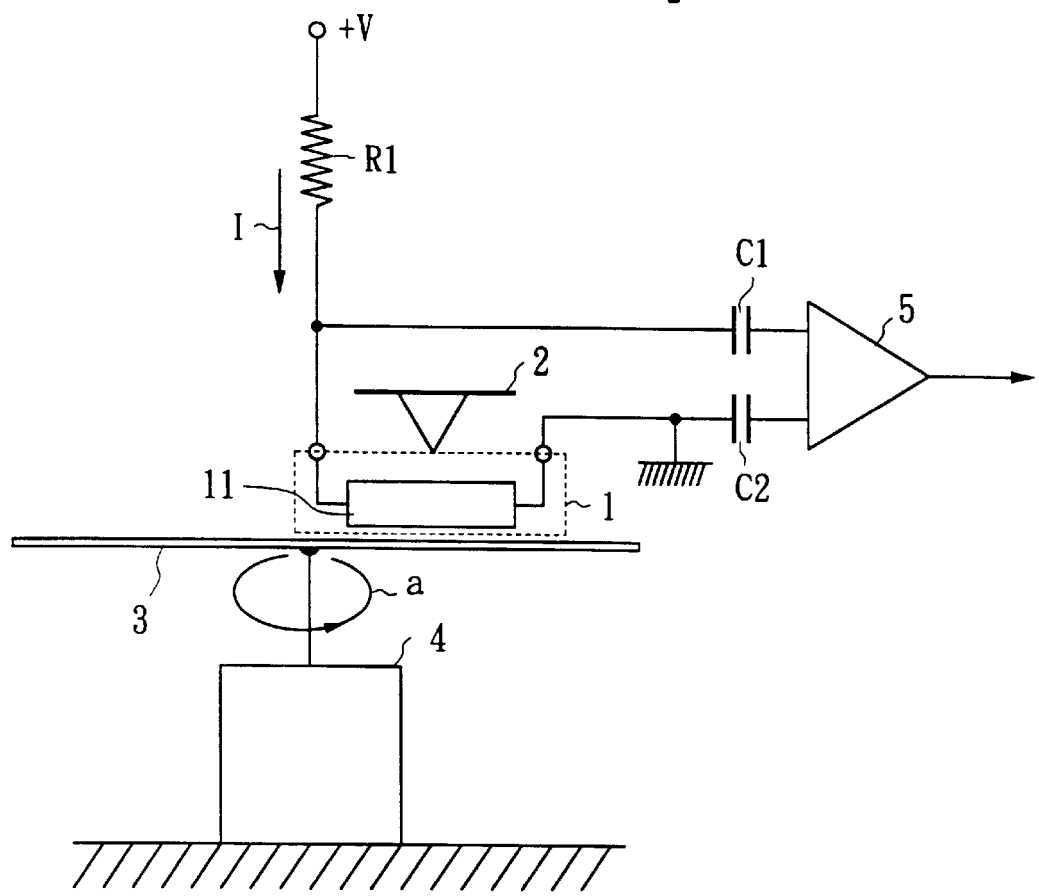
FIG. 1 shows a diagram of an electric circuit model that includes the thin film magnetic head and the magnetic disk in the magnetic disk recording and reproducing apparatus of the present invention.

FIG. 1 shows that the magnetic disk recording and reproducing apparatus of the present invention includes a thin film magnetic head 1, a head support assembly 2, a magnetic disk 3, a rotary drive device 4 and a signal processing circuit 5. The thin film magnetic head 1, includes a slider and thin film magnetic transducers which are not illustrated in the FIG. 1. The slider supports the thin film magnetic transducers. At least one of the thin film magnetic transducers is a read element 11 which consists of a magnetoresistive element. During read operations, sense current I is supplied to read element 11 which is a magnetoresistive element. Then a change in magnetic field H of the magnetic disk 3 is detected as a change in the electric resistance value. Sense current I runs through a circuit loop that includes resistance R1 and read element 11. R1 is the resistance for adjusting the sense current and C1 and C2 are capacitors that block the DC component in the sense current and which pass on only the AC component, which comprises the detection signal, to the signal processing circuit 5.

Because at least one of the thin film magnetic transducers in the thin film magnetic head 1 is a magnetoresistive read element 11, it is possible to achieve high read output without increasing the relative speed between magnetic disk 3 and thin film magnetic head 1. This makes it possible to achieve a magnetic disk recording and reproducing apparatus with superior high-frequency characteristics suitable for high-speed reads.

Figure 2:
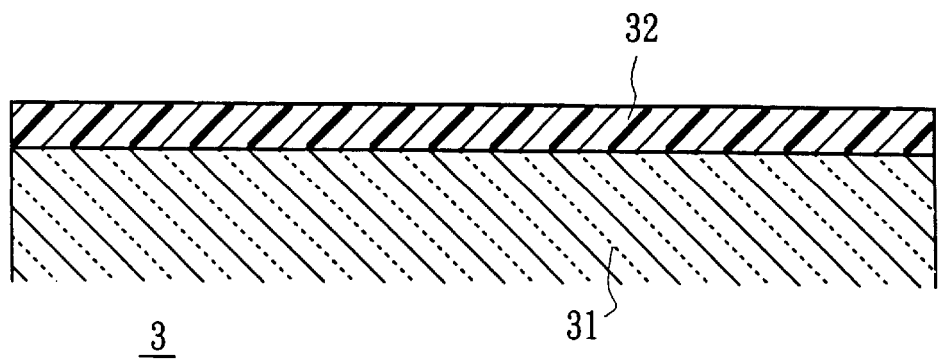
FIG. 2 is a partially enlarged cross-sectional view of the magnetic disk used in the present invention.

The magnetic disk 3 is rotated in the direction of the arrow (a) by the rotary drive device 4. The magnetic disk 3 has a magnetic film 32 on the surface of the substrate 31 as shown in FIG. 2. The surface resistivity ρ of the magnetic film 32 is selected so that ρ can be expressed as $\rho \geq 0.03 \Omega \cdot cm$.

If the surface resistivity ρ is selected so that ρ can be expressed as $\rho \geq 0.03 \Omega \cdot cm$, no electric leak or discharge will occur between the magnetoresistive element 11, which is mounted in the thin film magnetic head 1 and magnetic film 32 of magnetic disk 3.

Furthermore, because electric leak and discharge are prevented by controlling surface resistivity ρ of the magnetic film 32 unlike the method used in the prior technology, wherein an electrically insulating film is applied to the magnetic film 32 or the air-bearing surface of the thin film magnetic head 1, the present invention will not cause any loss of gap.

One effective means for selecting surface resistivity ρ of the magnetic film 32 within the range of $\rho \geq 0.03 \Omega \cdot cm$ involves using an oxidized magnetic film with main constituent being γ-iron oxide, for example, $Fe_2O_3$. With an oxidized magnetic film having γ-iron oxide as its main constituent, it is possible to select surface resistivity ρ within the range of $\rho \geq 0.03 \Omega \cdot cm$ by controlling the proportion of oxide at the surface of the magnetic film and making the film in such a way that the α-iron oxide content increases near the surface layer.

The magnetic film 32 can be made of metal or alloy. In either case, it is possible to select surface resistivity ρ within the range of $\rho \geq 0.03 \Omega \cdot cm$ by covering the surface of magnetic film 32 with a metallic oxide such as silicon oxide, alumina, α-iron oxide and so forth. When the magnetic film 32 is a metal or alloy, another effective means of selecting the surface resistivity ρ within the range of $\rho \geq 0.03 \Omega \cdot cm$ is to cover the surface of the magnetic film 32 with a nitrogen compound. A typical example of a magnetic film made of metal or alloy will include at least one of the following: iron, cobalt, nickel, as in Co-Ni and Co-Cr. The magnetic disk 3 can be recorded either vertically, wherein the main component of the recording residual magnetization is perpendicular to the film surface, or in-plane, wherein the main component of the recording residual magnetization is in the same plane as the film. An appropriate type of substrate 31 for the magnetic disk 3 should have glass as its principle component, with a surface roughness Rmax smaller than 100 Å. With the combination of the magnetic disk 3 and thin film magnetic head 1, even in a magnetic disk recording and reproducing apparatus with very low head flying height and little loss of gap wherein the actual flying height between the magnetic disk 3 and the magnetic film 32 is 0.1 μm or less, there is no risk of head crash. Actual examples of such a substrate 31 include ones wherein the principle constituent is glass, chemically reinforced soda alumino silicate glass or ceramics.

Figure 3:
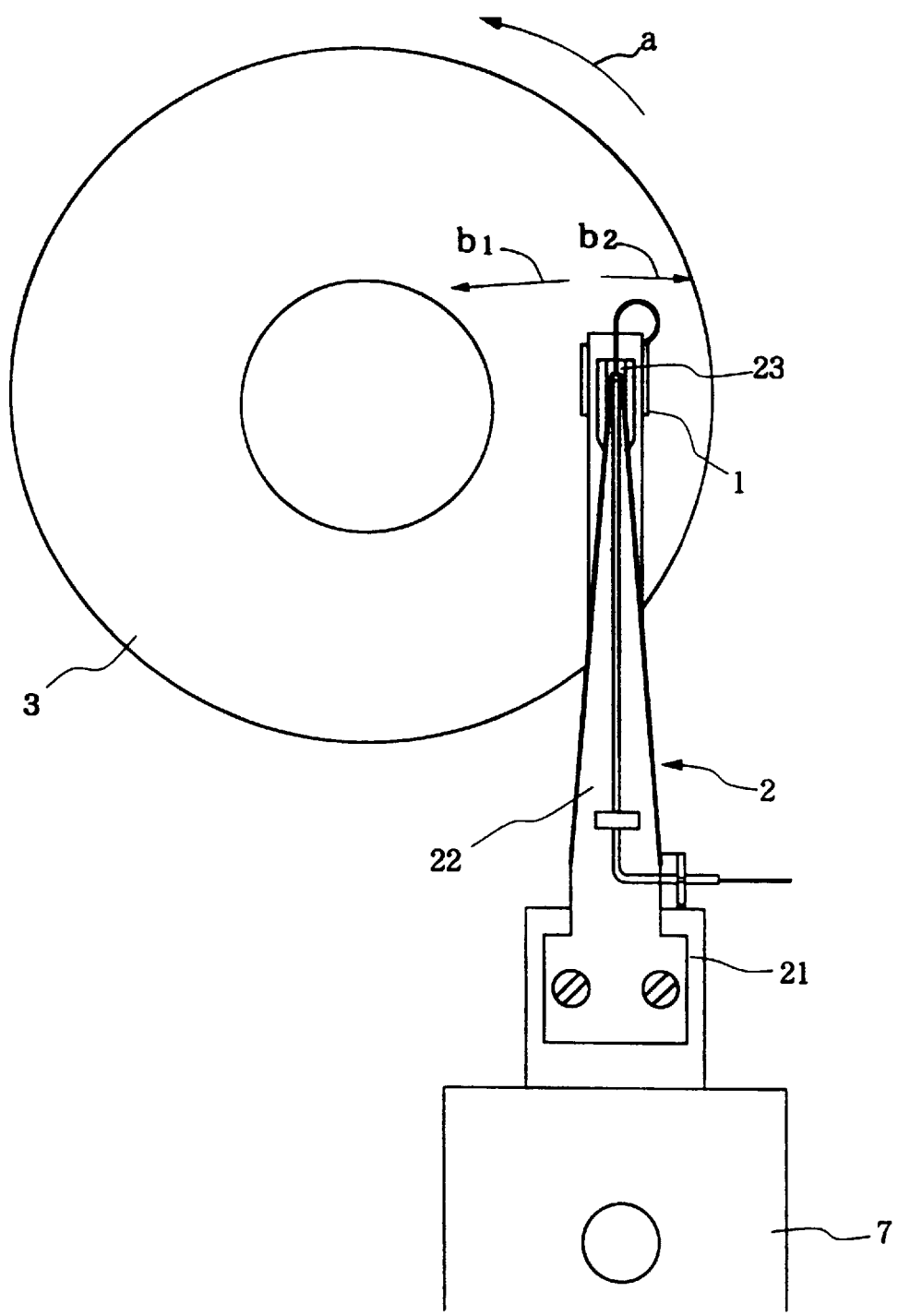
FIG. 3 is a plan view showing the configuration of a magnetic disk recording and reproducing apparatus of the present invention.

FIG. 3 shows the actual structure of a magnetic disk recording and reproducing apparatus; FIG. 4 is a front view of the magnetic head device used in the magnetic disk recording and reproducing apparatus; FIG. 5 is a bottom view of the same device. In these drawings, reference numeral 7 indicates the positioning device.

Figure 6:
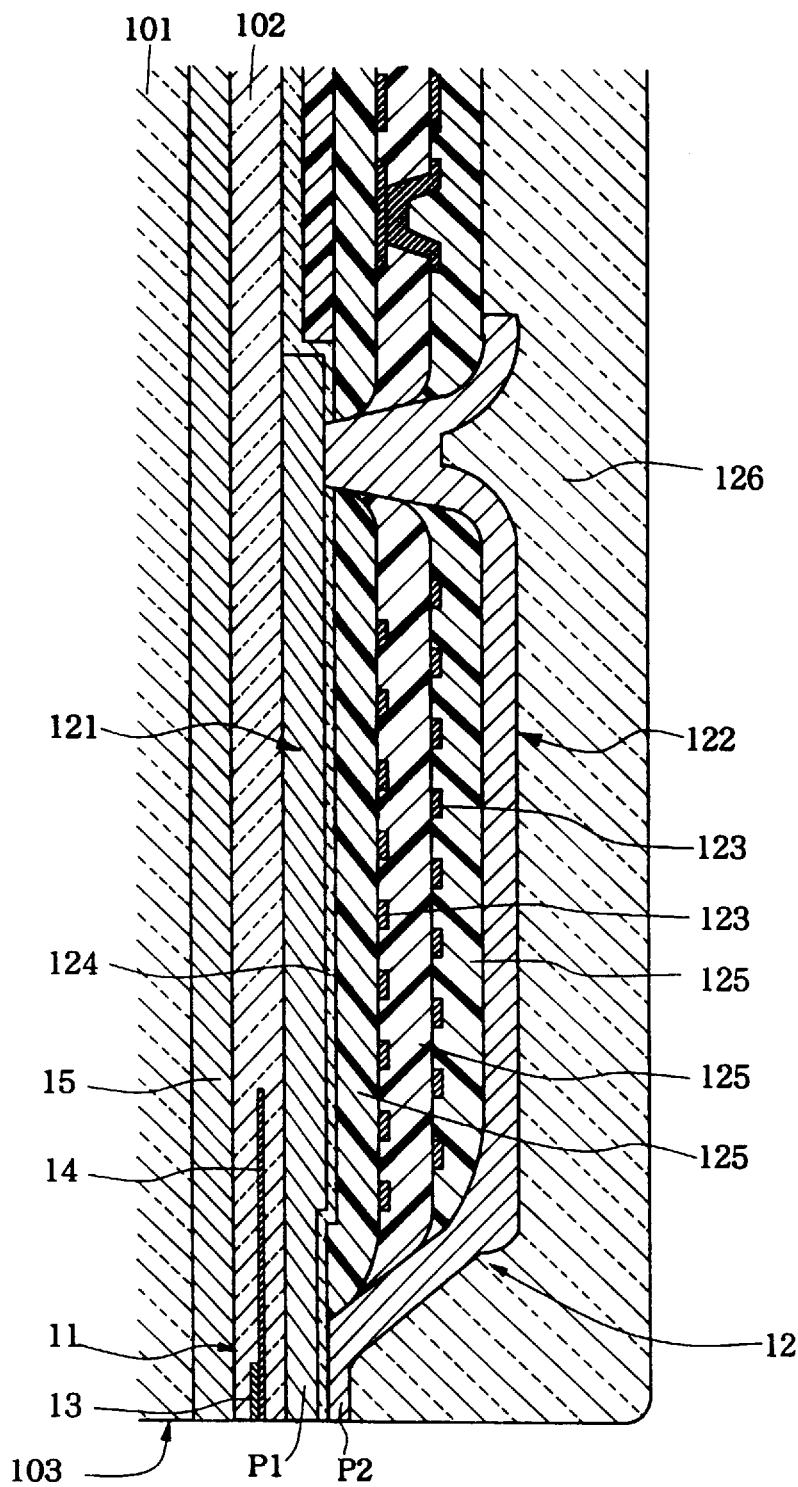
FIG. 6 is an enlarged cross-sectional view that illustrates a model of the structure of the thin film magnetic transducer in the thin film magnetic head used in the present invention.

The thin film magnetic head 1 is mounted at the tip of head support assembly 2 so that roll movement and pitch movement can be achieved. FIG. 6 is an enlarged cross-sectional view of the thin film magnetic head through the magnetic transducer. The thin film magnetic head illustrated in the FIG. 6 has a magnetoresistive read element 11 and a write element 12 that consists of an inductive-type magnetic transducer on the slider 10.

The slider 10 is a ceramic composition and it has an insulating film 101 made of $Al_2O_3$, $SiO_2$ or the like, upon a substrate made of, for example, $Al_2O_3$—TiC. The slider 10 has an air-bearing surface (hereafter referred to as the ABS) 103 on the side that faces the magnetic disk 3. For the slider 10, apart from the type wherein the rail section is on the side facing the magnetic disk 3 and the surfaces of the rails are used as the ABS, there is another type wherein the side facing the magnetic disk 3 is a flat surface without a rail section. In the latter case, almost all of the flat surface of that side is used as the ABS.

Read element 11 is structured by embedding a magnetoresistive element 13 inside the insulating film 102 in layers. Reference numeral 14 indicates a terminal conductor that supplies power to the magnetoresistive element 13. The magnetoresistive element 13 and the terminal conductor 14 are both present on the ABS 103 of the slider 10, thereby minimizing the loss of gap. A magnetoresistive element 13 is composed of a ferromagnetic thin film material such as Ni-Fe, Ni-Co or the like. A bias magnetic field is applied to the magnetoresistive element 13 in order to obtain a detection signal with good linearity against the input magnetic field as well as the sense current, which is supplied through the terminal conductor 14. As a means of generating a bias magnetic field, one of following methods can be adopted: (a) the shunt bias method, wherein a bias conductor film is formed directly on the magnetoresistive element and whereby a bias is applied by taking advantage of the magnetic field resulting from the current running through the bias conductor film, (b) the soft film bias method, wherein a magnetic field generated from the soft adjacent layer which is separated from the magnetoresistive element by the magnetic separation layer, or (c) the magnetic bias method, wherein a thin film permanent magnet is placed in proximity to the magnetoresistive element. Reference numeral 15 is a lower shield film which is composed of a magnetic film such as Permalloy, In the prior art, in order to minimize the loss of gap during read operations in magnetic recording, the magnetoresistive element 13 and the terminal conductor 14 were located on the ABS 103 of the slider 10. The problem with this has been that the sense current leaks to the ground side via the magnetoresistive element 13 and the terminal conductor 14 or a spark discharge is generated if the thin film magnetic head 1 comes in contact with the surface of the magnetic disk 3. With the magnetic disk recording and reproducing apparatus of the present invention, on the other hand, wherein the surface resistivity $\rho$ of the magnetic film 32 is selected within the range of $\rho \geq 0.03\Omega \cdot cm$, the sense current does not leak to the ground side via the magnetoresistive element 13 or terminal conductor 14 and neither does any spark discharge occur, even if the thin film magnetic head 1 comes in contact with the magnetic disk 3.

The write element 12 comprises a lower magnetic film 121, and an upper magnetic film 122, a coil film 123, a gap film 124 which is made of alumina or the like, an insulating film 125 consisting of an organic resin such as novolak resin, a protective film 126, etc. and is stacked in layers on top of an insulating film 102. The tips of the lower magnetic film 121 and the upper magnetic film 122 are pole sections P1 and P2 respectively which face each other across the very thin gap film 124. The write operation is performed at pole sections P1 and P2. They are linked with each other the behind the gap, which is at the yoke section of the lower magnetic film 121 and the upper magnetic film 122 and at the opposite ends of the pole sections P1 and P2, to complete the magnetic circuit. The coil film 123 is formed on top of the insulating film 125 in such a manner that it wraps in a spiral around the area where the two films are linked at the yoke section. Although FIG. 6 shows a magnetic head for an in-plane read/write device, the type of head can also be a magnetic head for a vertical magnetic read/write device.

The head support assembly 2 has a structure wherein one end of the supporter 22, which is made of a thin resilient metal plate, is mounted on to a rigid arm section 21, which is, in turn, mounted on the positioning device 7 and secured. The flexible member 23 is mounted to the free end of the supporter 22 in the longitudinal direction. The thin film magnetic head 1 is mounted under the flexible member 23 by such means as gluing. The loading projection 24 is mounted on the flexible member 23 or the supporter 22 and this loading projection 24 provides a spring load to the thin film magnetic head 1. For positioning, the head support assembly 2 is driven in the direction indicated by the arrows (b1) and (b2) by the positioning device 7, by which means magnetic read/write operations are performed on a specific track of the magnetic disk 3 by the thin film magnetic head 1. Concerning the structure of an installation of the thin film magnetic head 1 onto the head support assembly 2, the known types of structures include the so-called inline type, wherein the thin film magnetic head 1 is mounted in the longitudinal direction on the head support assembly 2, and the traverse type, wherein the thin film magnetic head 1 is mounted perpendicular to the longitudinal direction of the head support assembly 2.

The magnetic disk 3 is driven in the direction of arrow (a) by the drive device 4 (refer to FIG. 1) so that it will be rotated at a high speed; for example, at the rate of 3600 rpm. When the magnetic disk 3 is rotated at high speed, read/write operations are performed while thin film magnetic head 1, which is located over the surface of magnetic disk 3, floats at a specific height above the disk by using dynamic pressure generated between the ABS 103 of the magnetic head 1 and the magnetic disk 3. At the same time the surface resistivity $\rho$ of the magnetic film 32 on the magnetic disk 3 is within the range of $\rho \geq 0.03\Omega \cdot cm$. Therefore, no electric leak or discharge will occur between the magnetoresistive element 13 which is mounted in the thin film magnetic head 1 and the magnetic film 32 of the magnetic disk 3.

The magnetic disk recording and reproducing apparatus of the present invention can be driven using the contact—start stop is (CSS) method. When the magnetic disk 3 is still, the ABS 103 of the thin film magnetic head 1 is in contact with the surface of the magnetic disk 3 due to the spring load on the head support assembly 2. When the magnetic disk 3 starts rotating, lift pressure is generated on the ABS 103 of the thin film magnetic head 1 and operation starts with the amount of float by which this dynamic pressure and spring load are balanced. When the rotation of the magnetic disk 3 stops, the reverse of this lift operation occurs.

Obviously, numerous modifications and variations of the present invention are possible in light of the above descriptions. It is to be understood, therefore, that within the scope of the appended claims, the invention may be practically realized in other ways than those specifically described herein.

What is claimed is:

1. A magnetic disk recording and reproducing apparatus comprising a thin film magnetic head in combination with a magnetic disk, wherein:

said thin film magnetic head includes a slider and thin film magnetic transducers, said slider supports said thin film magnetic transducers, at least one of said thin film magnetic transducers is a read element comprising a magnetoresistive element through which sense current runs and which is present on the surface of said slider facing said magnetic disk, wherein a longitudinal direction of said magnetoresistive element is parallel to the magnetic disk, said disk is linked with a drive unit which is at a first electrical potential, and said magnetoresistive element is coupled to a second electrical potential which is equal to said first electrical potential, a surface resistivity ρ of a surface layer of said magnetic disk as an outermost surface facing the thin film magnetic head is within a range of ρ≧0.03Ω·cm to thereby prevent electric leakage of said sense current and discharge between said magnetoresistive element and said magnetic disk even if said magnetoresistive element contacts said magnetic disk during operation by passing the sense current through the magnetoresistive element to the second electrical potential when said magnetoresistive element contacts said magnetic disk.

2. The magnetic disk recording and reproducing apparatus according to claim 1, wherein said magnetoresistive element is present on a surface of said slider facing said magnetic disk of said thin film magnetic head.

3. The magnetic disk recording and reproducing apparatus according to claim 1, wherein said surface layer includes an oxide magnetic film.

4. The magnetic disk recording and reproducing apparatus according to claim 3, wherein said magnetic film has iron oxide as a principle component.

5. The magnetic disk recording and reproducing apparatus according to claim 4, wherein said magnetic film contains an increased proportion of α-iron oxide near the surface layer.

6. The magnetic disk recording and reproducing apparatus according to claim 1, wherein;

said magnetic disk has a substrate that contains glass as its principle component, and the surface roughness Rmax of said substrate is Rmax<100 Å.

7. The magnetic disk recording and reproducing apparatus according to claim 1, wherein;

said thin film magnetic transducers include a write element, and said write element has a magnetic film and coil film that, together with said magnetic film, constitutes a magnetic circuit.

8. The magnetic disk recording and reproducing apparatus according to claim 7, wherein;

said magnetic film of said magnetic head includes a lower magnetic film and an upper magnetic film, the said upper magnetic film is created on top of the said lower magnetic film with an insulating film between them, said lower magnetic film an upper magnetic film have tips comprising pole sections that form a transducer gap at one end and are linked at the other end to complete a magnetic circuit, and said coil film is formed in a spiral around the linked part of said films.

9. The magnetic disk recording and reproducing apparatus according to claim 1, wherein said surface layer of said magnetic disk includes a magnetic film and a flying height generated between said thin film magnetic head and said magnetic film of said magnetic disk is 0.1 μm or less.

10. A magnetic disk recording and reproducing system comprising:

a thin film magnetic head comprising:
a slider; and
a plurality of thin film transducers formed on the slider;

a magnetic disk linked with a drive unit which is at a first electrical potential;

wherein at least one of the plurality of thin film transducers is a read element comprising a magnetoresistive element through which sense current runs and which is present on the surface of said slider facing said magnetic disk, wherein a longitudinal direction of said magnetoresistive element is parallel to the magnetic disk;

said magnetoresistive element is coupled to a second electrical potential which is equal to said first electrical potential, said magnetic disk comprising a surface layer as an outermost surface facing the thin film magnetic head having a surface resistivity greater than or equal to 0.03Ω·cm to thereby prevent electric leakage of said sense current and discharge between said magnetoresistive element and said magnetic disk even if said magnetoresistive element contacts said magnetic disk during operation by passing the sense current through the magnetoresistive element to the second electrical potential when said magnetoresistive element contacts said magnetic disk.

11. The magnetic disk recording and reproducing system according to claim 10, wherein said surface layer includes an oxide magnetic film.

12. The magnetic disk recording and reproducing system according to claim 11, wherein said magnetic film comprises iron oxide.

13. The magnetic disk recording and reproducing system according to claim 12, wherein said magnetic film contains an increased proportion of α-iron oxide near the magnetic film surface facing the thin film magnetic head.

14. The magnetic disk recording and reproducing system according to claim 10, wherein;

said magnetic disk further comprises a substrate on which a magnetic film is formed, the substrate comprising glass as a component, and a surface roughness Rmax of said substrate is Rmax<100 Å.

15. The magnetic disk recording and reproducing system according to claim 10, wherein said plurality of thin film transducers further comprise a write element.

16. The magnetic disk recording and reproducing system according to claim 15, wherein;

said write element comprises a lower magnetic film, an upper magnetic film, and a coil film, the upper magnetic film is created on top of the lower magnetic film with an insulating film formed between them, said lower magnetic film and said upper magnetic film have tips comprising pole sections that form a transducer gap at one end and are linked at the other end to complete a magnetic circuit, and said coil film is formed in a spiral around the linked part of said films.

17. The magnetic disk recording and reproducing system according to claim 10, wherein said surface layer of said magnetic disk includes a magnetic film and a flying height generated between said thin film magnetic head and said magnetic film of said magnetic disk is 0.1 μm or less.

18. A method for preventing sense current which runs through a magnetoresistive element mounted on a thin film magnetic head, from leaking from said magnetoresistive element to a magnetic disk when said magnetoresistive element contacts said magnetic disk;

said thin film magnetic head including a slider, supporting said magnetoresistive element;

said magnetoresistive element being formed on a surface of said slider facing said magnetic disk, wherein a longitudinal direction of said magnetoresistive element is parallel to the magnetic disk; and said magnetic disk being linked with a drive unit which is at a first electrical potential and said magnetoresistive element being coupled to a second electrical potential which is equal to said first electrical potential, wherein:

a surface resistivity ρ of a surface layer of said magnetic disk as an outermost surface facing the thin film magnetic head is within the range of ρ>0.03Ω·cm to thereby prevent electric leakage of said sense current and discharge between said magnetoresistive element and said magnetic disk even if said magnetoresistive element contacts said magnetic disk during operation by passing the sense current through the magnetoresistive element to the second electrical potential when said magnetoresistive element contacts said magnetic disk.

19. A method according to claim 18, wherein:

conducting films for power supply are formed on a surface of said slider facing a medium of said thin film magnetic head.

20. A method according to claim 18, wherein:

said surface layer includes an oxide magnetic film.

21. A method according to claim 20, wherein:

said magnetic film has iron oxide as a principle component.

22. A method according to claim 21, wherein:

said magnetic film contains an increased proportion of α-iron oxide near a surface layer.

23. A method according to claim 18, wherein:

said surface layer includes a metal or an alloy magnetic film and a metallic oxide.

24. A method according to claim 18, wherein:

said surface layer includes a metal or an alloy magnetic film; and the surface layer further includes a nitrogen compound on the magnetic film.

25. A method according to claim 18, wherein:

said magnetic disk has a substrate that contains glass as its principle component, and a surface roughness Rmax of said substrate is Rmax>100 Å.

26. A method according to claim 18, wherein:

said thin film magnetic head includes a write element; and said write element has a magnetic film and coil film that, together with said magnetic film, constitute a magnetic circuit.

27. A method according to claim 26, wherein:

said magnetic film of said magnetic head includes a lower magnetic film and an upper magnetic film;

the said upper magnetic film is formed on top of the said lower magnetic film with an insulating film between them;

said lower magnetic film and said upper magnetic film have tips comprising pole sections that form a transducer gap at a first end and are linked at a second end to complete a magnetic circuit; and said coil film is formed in a spiral around the linked part of said films.

28. A method according to claim 18, wherein:

a flying height generated between said thin film magnetic head and said surface layer of said magnetic disk is 0.1 μm or less.

* * * * *